Nov. 4, 1969   T. D. SCHMALBRUCH   3,475,952
TORQUE TESTING INSTRUMENT
Filed May 26, 1967
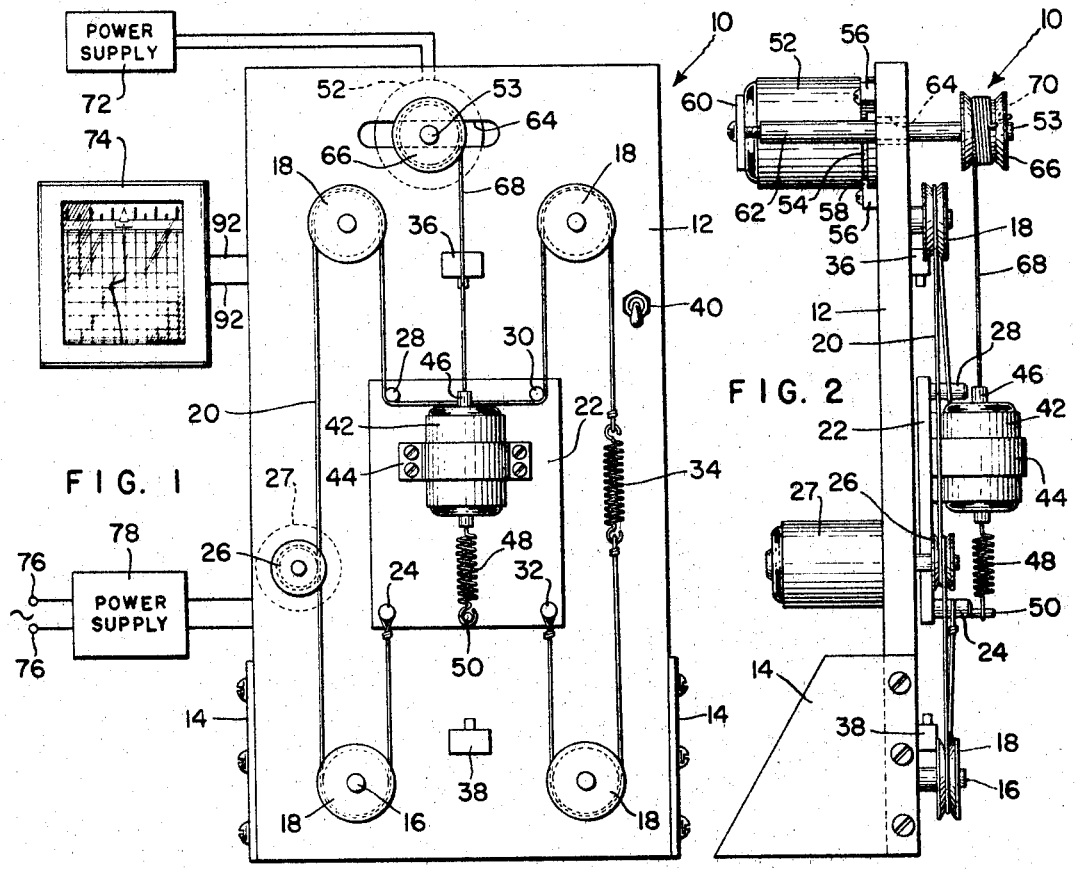
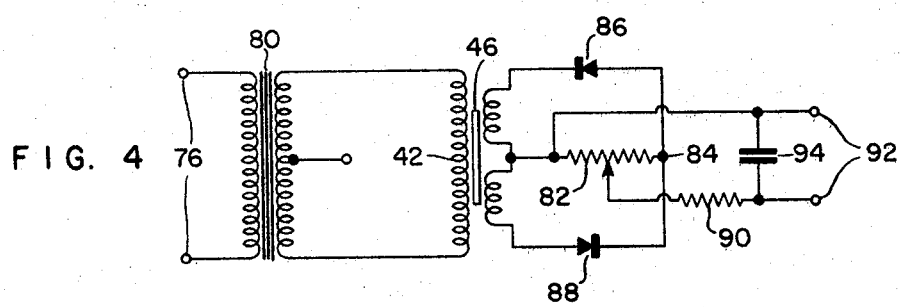
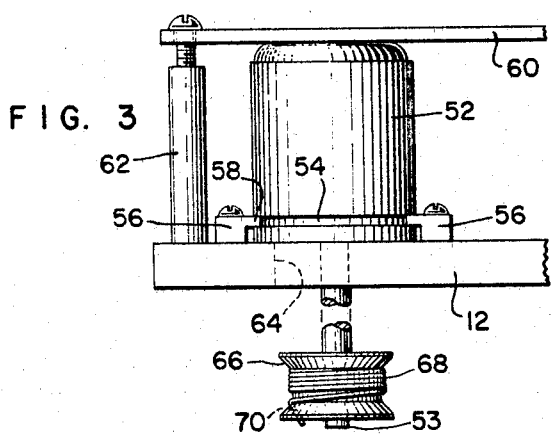
INVENTOR.
T. DANKWARD SCHMALBRUCH
BY
ATTORNEY.

> United States Patent Office 3,475,952
Patented Nov. 4, 1969

3,475,952
TORQUE TESTING INSTRUMENT
T. Dankward Schmalbruch, Newtown, Pa., assignor to Honeywell Inc., Minneapolis, Minn., a corporation of Delaware
Filed May 26, 1967, Ser. No. 641,677
Int. Cl. G01l 3/18; G01n 15/00
U.S. Cl. 73—134                                   10 Claims

ABSTRACT OF THE DISCLOSURE

A torque variation tester which tests for variations of torque output through 360° of rotational motion of a motor or other torque device having a motor mounting frame to which a movable mounting plate is attached. A linear variable differential transformer mounts on the movable mounting plate having a core attached by a strand to a pulley on the motor shaft. A spring attaches the other end of the core to the movable mounting plate whereby the motion of the plate allows the motor to rotate through 360° while the stall torque thereof is measured by the linear variable differential transformer.

---

The present invention relates to a test instrument and, more particularly, to a torque variation tester for sensing and recording the variations within the torque output of a prime mover.

The utilization of a Prony brake for measuring the torque of a prime motor, such as the electric motor, has been known in the art for some time. However, this type of arrangement restricts the measurement of motor torque to a fixed position and does not allow for the measurement of output torque through a full 360° of motor rotation. In early applications, the necessity for measuring the output torque through the full 360° of motor rotation was not important. In present day sophisticated systems, however, it is often necessary to test a motor for variations in output torque through its full 360° of rotational displacement. Using the prior art testing procedures to establish a picture of output torque through a full 360° of rotational displacement of a motor is tedious, time consuming, inaccurate and expensive. Further, such a test could never give an accurate picture of the torque through each integral portion within the limits of the 360° rotational displacement.

Accordingly, it is an object of the present invention to provide a torque variation tester which is capable of sensing the output torque of a prime mover through a full 360° of its rotational displacement.

It is another object of this invention to provide a torque variation tester which will record the output torque of a prime mover as that prime mover rotates through 360° in either direction.

Still another object of this invention provides a torque variation tester for accurately sensing and rapidly recording the torque of any electric motor as that motor rotates through its full 360° of shaft displacement.

A further object of the invention presented herein is to provide a torque variation tester having a sensing element that will smoothly indicate the output torque of an electric motor through 360° of its shaft displacement without introducing steps or variations in that indication.

A still further object of the present invention is to provide a record of the torque variation of an electric motor which may be established when the motor is manufactured and shipped with the motor for indicating the motor torque variation accurately to within less than one-half percent.

Other objects and many of the attendant advantages of the present invention will become readily apparent to those skilled in the art as a better understanding thereof is obtained by reference to the following description when considered in connection with the accompanying drawings, wherein:

FIG. 1 is a front elevation, showing the torque variation tester of the present invention;

FIG. 2 is a side elevation, also showing the torque variation tester;

FIG. 3 is a plan view, showing a prime mover which is being tested for torque variation clamped at its proper location upon the torque variation tester; and FIG. 4 is a schematic representation showing the connection of the sensing element of the torque variation tester to a recording instrument.

The torque variation tester of the present invention includes a motor mounting frame to which a prime mover, such as an electric motor, may be mounted with its drive shaft extended through the mounting frame to the test side thereof. A pulley mounts upon the motor shaft about which is wrapped a strand of suitable material for attachment to a sensing element. The sensing element mounts upon a movable mounting plate which is arranged to be driven between fixed limits. A constant current power supply provides the electric motor with a driving torque which is sensed by the sensing element. A spring, attached to the movable mounting plate, prevents the electric motor from rotating and provides a force against which the output torque of the motor is balanced for comparison by the sensing element. A second electric motor is provided for driving the movable mounting plate between its fixed limits. This arrangement allows the electric motor to rotate slowly through its full 360° of shaft rotation while its stall torque is measured by the sensing element. The output of the sensing element is then recorded by a suitable recording instrument.

Referring now to the drawings, and more particularly to FIG. 1, the torque variation tester is shown generally at 10 having a motor mounting frame 12 which may be suitably mounted by support wings 14, FIG. 2. Four mounting shafts 16 are attached to the front surface of the motor mounting frame 12, one in each corner. Rotatably attached to the shafts 16 are grooved pulleys 18 which support a drive cable 20. The drive cable 20 passes over each grooved pulley 18 and is attached to a rectangularly shaped movable mounting plate 22. That is, one end of the drive cable 20 is attached to the lower left-hand corner of the movable mounting plate 22 by a suitable pin 24. The drive cable extends downwardly from pin 24 around the lower left-hand grooved pulley 18 and then upwardly where it is wrapped about a drive pulley 26. The drive pulley 26 attaches to the shaft of a drive motor 27 which provides the driving force to the drive cable 20. The drive cable is wrapped 360° about the driving pulley 26 and then upwardly extended to wrap 180° about the upper left-hand grooved pulley 18 before extending downwardly toward the movable mounting plate 22. The drive cable 20 is then wrapped 90° about a fixed pin 28, in the upper left-hand corner of the movable mounting plate 22. The cable 20 passes across the upper surface of the movable mounting plate 22 where it again wraps 90° about a second fixed pin 30, in the upper right-hand corner of the plate. As the drive cable 20 extends upwardly from the mounting plate 22, it wraps 180° about a third grooved pulley 18, mounted in the upper right-hand corner of the mounting frame 12, and then extends downwardly to wrap about the final grooved pulley 18, in the lower right-hand corner of the mounting frame. After passing about the last pulley, the drive cable 20 is directed upwardly where it attaches to the lower right-hand corner of the movable mounting plate by a suitable pin 32. The drive cable is constructed in two segments with the shorter segment extending from the pin 32 about the lower right-hand grooved pulley to a tension spring 34. The tension spring provides a constant tension within the drive cable 20 which supports the movable mounting plate 22 between upper and lower limits. The upper and lower limits are formed by switches 36 and 38, respectively. A toggle switch 40 is provided which supplies current to the driving motor 27 for rotating the drive pulley 26 in a clockwise or counterclockwise direction and thereby driving the movable mounting plate 22 in an upwardly or downwardly direction, respectively. As the movable mounting plate 22 reaches its upper limit, it contacts the switch 36 to break the circuitry between the toggle switch 40 and the drive motor 27. Conversely, when the movable mounting plate 22 reaches its lowermost position, it engages the lower switch 38 for turning off the driving motor.

A sensing element 42 is suitably mounted upon the movable mounting plate 22, as by a strap 44. In the preferred embodiment the sensing element is illustrated as a linear variable differential transformer although other suitable sensing elements, such as a strain gauge, may be utilized without departing from the scope of the present invention. The linear variable differential transformer 42 is provided with a core 46 which is attached at its lower end to a spring 48. The spring 48 is attached to the movable mounting plate 22 by pin 50. The upper end of the spring 48 attaches to the core 46 of the linear variable differential transformer 42 by a suitable nonmetallic material for preventing error in the output of the sensing element.

An electric motor 52, which is to be tested for variations in its output torque, is mounted to the back surface of the motor mounting frame 12, with its shaft 53 extending therethrough. As shown in FIG. 3, the motor to be tested is formed with a mounting groove 54 cut into its outer surface. Mounting blocks 56, having suitable extended tabs 58, are provided to engage the groove 54 and clamp the motor to the back surface of the mounting frame 12. If the motor is not equipped with a suitable mounting groove, a clamping bar 60 may be provided which attaches to the main frame 12 by a screw and standoff arrangement 62. This arrangement clamps the electric motor 42 by forcing the shaft end-bell tightly against the back surface of the mounting frame 12. The motor shaft 53 extends through a slot 64 within the main frame 12. Thus, the arrangement described herein provides for the mounting of electric motors 52 of various shapes and sizes.

A test pulley 66 is placed upon the motor shaft 53 and attached thereto by a clamp, not shown. The diameter of the test pulley 66 is established at two inches for reasons which will become obvious hereinbelow. A strand element 68 is attached to the upper end of the core 46 and extended upwardly therefrom for attaching to the test pulley 66. The strand element is wrapped about the test pulley 66 with each turn adjacent the last and no turns crossing the other. The strand is then attached to the pulley 66 by passing it through a groove 70 in the outer flange thereof, much the same way a thread is attached to a spool. This arrangement attaches the electric motor 52 to the movable mounting plate 22 through the spring 48. When the electric motor 52 is energized through a constant current power supply 72, the output torque of the motor 52 creates a displacement within the spring 48 until the force created by the spring cancels the torque and the motor 52 stalls. The displacement of the spring 48 is reflected as a change in the output of the linear variable differential transformer 42 which, in turn, is recorded upon a suitable recording instrument 74.

Referring to FIG. 4, the schematic of the torque variation tester 10 is shown. The torque variation tester is provided with AC current through input terminal 76 and a suitable power supply 78. The input from the terminal 76 is connected to the primary winding of a transformer 80 which is utilized to reduce the line voltage. The secondary windings of the transformer 80 are connected to the primary windings of the linear variable differential transformer 42. There are two secondary windings within the linear variable differential transformer 42. The common terminals of the two secondary windings are connected to one end of the slidewire within a potentiometer 82, while the other end thereof connects to a junction point 84. The second terminals of the secondary windings within the linear variable differential transformer 42 are each connected to the junction point 84 through diodes 86 and 88. That is, one of the two secondary windings connects to the cathode of diode 86; and the other connects to the anode of diode 88, thus providing half wave rectified voltage at the junction point 84. The wiper arm of the potentiometer 82 connects through a filtering resistor 90 to an output terminal 92, while the common terminals of the secondary windings connect directly to a second output terminal 92. A capacitor 94 is provided between the output terminals 92 for completing the filtering network. The output terminals 92 are connected directly to the input of the recording instruments 74.

In operation, the electric motor to be tested is mounted upon the back surface of the mounting frame 12 by suitable clamping means, such as those illustrated in FIG. 2. The test pulley 66 is attached to the shaft 53, which extends through the slot 64 in the mounting frame 12, and the strand element 68 is wrapped around the test pulley, being careful to wrap only one layer of the strand element thereabout per turn. The electric motor 52 is then energized by the constant current power supply 72. The motor 52 will begin to rotate, for example in the counterclockwise direction, until restrained by the force exerted by the extension of the spring 48, attached to the movable mounting plate 22. The output torque of the motor is thus balanced against a force exerted by the spring 48. The extension of the spring 48 is sensed by the deflection of the core 46 within the linear variable differential transformer 42. The amount of deflection of the core 46 causes a variation in the output voltage across the output terminals 92 which, in turn, is recorded upon the recording instrument 74. Assuming the movable mounting plate 22 is in its lowermost position, the placement of the toggle switch 40 in the up position will cause the movable mounting plate to rise. That is, the drive motor 27 is energized and caused to rotate in a clockwise direction for driving the drive pulley 26 in a clockwise direction and winding the driving cable 20 thereabout for moving the movable mounting plate upwardly. The upward motion of the movable mounting plate is slow and constant for providing the electric motor 52 with a slowly moving reference frame which holds the motor effectively in a stalled condition. Thus, the motion of the movable mounting plate 22 allows the linear variable differential transformer 42 to record the torque of the stalled motor 52 as it is slowly turned through a full 360° of shaft rotation. Once the movable mounting plate 22 has reached its upper limit, it energizes the switch 36 for stopping the drive motor 27. The toggle switch 40 is then placed in the down position and the drive pulley 26 is rotated in a counterclockwise direction for lowering the movable mounting plate 22. It should be noted that in the arrangement just described, the recorded torque of the motor 52 will be less, as the movable mounting plate 22 is displaced upwardly, than when the mounting plate 22 is displaced downwardly. This is because the friction within the system subtracts from the value of the recorded output torque, as the movable mounting plate 22 moves with the rotation of the test motor, and adds to the recorded output torque as the movable mounting plate moves against the motor rotation. For this reason, the motor should be tested in both directions and the recorded output torque averaged to obtain a true picture of the output torque.

The torque variation tester is calibrated by turning off the constant current power supply 72 and, if the motor being tested is a DC motor, removing the brushes from the motor. The strand element 68 is unwrapped from about the test pulley 66 and allowed to hang down freely therefrom. The recording instruments 74 and the torque variation tester are then energized. Weights, for example calibrated in ounces, are hung from the free end of the strand element 68 and the extension which they cause in the spring 48 is sensed by the linear variable differential transformer 42 and recorded upon the recording instrument 74. Since the radius of the test pulley 66 is one inch and the strand element is wrapped thereabout in a single layer, the curve recorded upon the recording instrument 74 is read directly in inch-ounces. Obviously, the pulley 66 could be arranged having a radius in centimeters and the weights could be calibrated in grams for providing a direct read-out in gram-centimeters. With this arrangement, the calibration of the spring 48 becomes unimportant since the torque variation tester can be quickly calibrated to read torque directly. The calibration also eliminates other system errors, such as friction and inaccuracies in the recording instrument.

The embodiments of the invention in which an exclusive property or privilege is claimed are defined as follows:

1. A torque variation tester for testing the torque output of a prime mover through 360° of its rotational motion, comprising:
   means for mounting said prime mover;
   movable means arranged upon said means for mounting said prime mover;
   force extensive means attached to said movable means;
   means attaching said force extensive means to said prime mover operable to stall the rotational motion of said prime mover through the force exerted by the extension of said force extensive means;
   sensing means attached to said movable means for measuring the force exerted by the extension of said force extensive means which stalls said rotational motion of said prime mover; and
   means for slowly moving said movable means for allowing said prime mover to slowly rotate thus allowing said sensing means to smoothly measure the force exerted by the extension of said force extensive means which stalls said rotational motion of said prime mover as said prime mover is slowly rotated through 360° of said rotational motion.

2. A torque variation tester as claimed in claim 1 wherein said sensing means includes an electrical sensor which changes its impedance characteristics in response to the extension of said force extensive means.

3. A torque variation tester as claimed in claim 2 wherein said electrical sensor includes a linear variable differential transformer.

4. A torque variation tester as claimed in claim 3 wherein said linear variable differential transformer includes a core means and wherein said core means attaches at one end to said force extensive means and at the other end to said prime mover.

5. A torque variation tester as claimed in claim 1 wherein said movable means further comprises plate means, pulley means rotatably mounted upon said means for mounting said prime mover, cable means attached to said plate means and suspended from said pulley means for movably supporting said plate means, and drive means engaging said cable means for linearly moving said plate means.

6. A torque variation tester as claimed in claim 5 wherein said means attaching said force extension means to said prime mover includes pulley means mounted upon said prime mover and a strand extending from said sensing means and wrapped about said pulley means.

7. A torque variation tester as claimed in claim 6 wherein said force extensive means includes a spring attached to said sensing means at one end and said plate means at the other end.

8. A torque variation tester as claimed in claim 5 additionally comprising limit switch means for deenergizing said drive means as said drive plate means reaches the limits of said linear motion thereof.

9. A torque variation tester as claimed in claim 1 wherein said sensing means includes a linear variable differential transformer having primary and secondary windings, a potentiometer, rectifying means connecting said secondary winding to said potentiometer, and output means for receiving an attenuated signal from said potentiometer for representing the condition of said sensing means.

10. A dynamometer for measuring the output torque of a rotating device through 360° of rotational motion, comprising:
    means for mounting said rotating device,
    means for stalling said rotating device in a stalled position,
    means for measuring the force exerted by said means for stalling said rotating device in said stalled position, and
    means for smoothly moving said means for stalling and said means for measuring the force exerted by said means for stalling thus causing said stalled position of said rotating device to smoothly move through 360° of said rotational motion,
    whereby said force exerted by said means for stalling said rotating device may be measured through 360° of said rotational motion for determining the output torque thereof.

References Cited

UNITED STATES PATENTS

| 2,641,925 | 6/1953 | Altman | 73—116 |
| 2,847,854 | 8/1958 | Burstyn | 73—134 |
| 3,286,504 | 11/1966 | Crabovac | 73—1 |

FOREIGN PATENTS

| 877,505 | 5/1953 | Germany. |

CHARLES A. RUEHL, Primary Examiner

U.S. Cl. X.R.

73—1, 116